United States Patent [19]

Schnaitmann et al.

[11] Patent Number: 5,800,607
[45] Date of Patent: Sep. 1, 1998

[54] PROCESS FOR THE PREPARATION OF LIQUID PIGMENT PREPARATIONS

[75] Inventors: Dieter Schnaitmann, Eppstein; Martin Böhmer, Neu-Anspach; Manfred Urban, Wiesbaden, all of Germany

[73] Assignee: Hoechst Aktiengesellschaft, Frankfurt, Germany

[21] Appl. No.: 675,448

[22] Filed: Jul. 3, 1996

[30] Foreign Application Priority Data

Jul. 6, 1995 [DE] Germany .......................... 195 24 624.1
May 6, 1996 [DE] Germany .......................... 196 18 056.2

[51] Int. Cl.⁶ .................................................. C09B 67/50
[52] U.S. Cl. .................. 106/412; 106/410; 106/411; 106/413; 106/493; 106/494; 106/495; 106/496; 106/497; 106/498; 540/141; 540/144; 546/49; 546/50
[58] Field of Search .................... 106/410, 411, 106/412, 413, 493, 494, 495, 496, 497, 498; 540/141, 144; 546/49, 50

[56] References Cited

U.S. PATENT DOCUMENTS

| | | |
|---|---|---|
| 3,752,688 | 8/1973 | Fuchs et al. . |
| 3,775,149 | 11/1973 | Langley et al. .................. 540/141 |
| 4,253,839 | 3/1981 | Spietschka et al. ............... 106/498 |
| 4,522,654 | 6/1985 | Chisvette et al. ............... 106/31.76 |
| 5,062,577 | 11/1991 | Schmitt et al. .................. 241/171 |
| 5,074,918 | 12/1991 | Bäbler ............................ 106/493 |
| 5,296,033 | 3/1994 | Dietz et al. ..................... 106/412 |
| 5,296,034 | 3/1994 | Dietz et al. ..................... 106/410 |
| 5,318,627 | 6/1994 | Dietz et al. ..................... 106/493 |
| 5,492,563 | 2/1996 | Urban ............................ 106/412 |
| 5,614,014 | 3/1997 | Urban ............................ 106/493 |
| 5,626,662 | 5/1997 | Urban ............................ 106/493 |

FOREIGN PATENT DOCUMENTS

| | | |
|---|---|---|
| 1150213 | 7/1983 | Canada . |
| 0069394 | 1/1983 | European Pat. Off. . |
| 0408499 | 1/1991 | European Pat. Off. . |
| 0666288 | 8/1995 | European Pat. Off. . |
| 0678559 | 10/1995 | European Pat. Off. . |
| 1249665 | 3/1961 | France . |
| 1434259 | 6/1966 | France . |
| 2107305 | 5/1972 | France . |
| 3016052 | 11/1982 | Germany . |
| 3446177 | 7/1985 | Germany . |
| 3716587 | 4/1988 | Germany . |
| 1096192 | 12/1967 | United Kingdom . |
| 2051108 | 1/1981 | United Kingdom . |

*Primary Examiner*—Mark L. Bell
*Assistant Examiner*—Scott L. Hertzog
*Attorney, Agent, or Firm*—Susan S. Jackson

[57] ABSTRACT

Process for the preparation of pigment preparations, which comprises wet milling the crude pigments which are present in coarsely crystalline state, or prepigments or pigments which are present in a form in which they are difficult to disperse, in a concentration of from 20 to 60% by weight based on the total weight of the pigment preparation, in a flocculation-stable liquid medium and in a stirred ball mill which is operated with a peripheral stirrer speed of more than 12 m/s, under the action of nonmetallic grinding media with a diameter of less than or equal to 1.0 mm, until the desired degree of fine division is reached, and then isolating the pigment preparation.

14 Claims, No Drawings

PROCESS FOR THE PREPARATION OF LIQUID PIGMENT PREPARATIONS

The present invention relates to a particularly environment-friendly and economic process for the preparation of liquid pigment preparations.

Pigment preparations are dispersions of pigments in carrier materials. In addition to the pigment and the carrier material it is also possible for additives to be present. The pigments are dispersed in the carrier material and are completely enveloped by it. The carrier materials are identical to, similar to or at least highly compatible with the intended application media. The pigments are present in the pigment preparations in a higher concentration than in the subsequent application medium.

Pigment preparations are used as colorants for pigmenting high molecular weight materials such as paints, printing inks, plastics and inks for textile printing. In the incorporation of pigments into paints, printing inks, plastics and inks for textile printing difficulties often occur, since numerous pigments, in the application medium, can be brought into a dispersed state with satisfactory performance properties only with great effort. If the pigment particles are too coarse, and as a result the optimum color strength is not attained, it is not possible to produce serviceable pigment preparations. During and after a dispersion operation it is possible for flocculation phenomena to occur which lead to changes in the viscosity of the application medium, to changes in shade and to losses in color strength, opacity, luster, homogeneity and brilliance in the colored materials. These difficulties can be avoided by the use of appropriate pigment preparations. Pigment preparations can normally be incorporated into the carrier materials with little dispersion effort and without ecological problems, and are notable in numerous application media for their outstanding color and flow properties as well as for favorable flocculation and settling behavior.

It is finely divided pigments which are normally employed to prepare pigment preparations. In this case, incorporation into the carrier materials is by dispersion in roll mills, vibration mills, stirred ball mills, mixers, roller beds or kneading apparatus. The dispersion apparatus used depends on the dispersibility of the pigment employed, on the carrier material and on the additive. In some cases, the coarsely crystalline crude pigments are also employed. In this case, fine division and dispersion are combined with one another in a simple manner, without the laborious fine division of the coarsely crystalline crude pigments in flocculation-unstable media, and without the finishing operation.

U.S. Pat. No. 5,318,627 (I) describes a process for preparing dioxazine pigment formulations based on C.I. Violet 23 by bead milling of coarsely crystalline crude pigments and subsequent solvent finish. U.S. Pat. No. 5,296,033 (II) describes a process for the preparation of phthalocyanine pigment formulations by bead milling of coarsely crystalline crude pigments and subsequent solvent finish. U.S. Pat. No. 5,296,034 (III) describes a process for the preparation of phthalocyanine pigment formulations of the α-phase by bead milling coarsely crystalline crude pigments and subsequent solvent finish. According to processes I to III, pigment formulations are prepared, which unlike the pigment preparations do not include carrier materials. They can therefore be incorporated into paints, printing inks and plastics only with a great dispersion effort. Bead milling takes place in flocculation-unstable media in order to facilitate the separation of the aqueous phase and the working up of the pigment formulation suspensions. Owing to the unfavorable flow behavior and settling behavior of the millbase, it is not possible to employ high pigment concentrations. Consequently, the pigment concentration in the case of bead milling in the stirred ball mill is less than 20%, and higher concentrations are possible only in a few specific cases. At high pigment concentrations, millbase flowability decreases to such an extent that the milling effect is signicantly restricted, with the result that the required degree of fine division is no longer achieved. Therefore the viscosity of the millbase in the case of continuous milling is in the lower viscosity range, at below 0.1 Pas. Milling is followed by a solvent finish.

GB-A-2 051 108 (IV) describes the preparation of aqueous phthalocyanine pigment dispersions by wet milling of coarsely crystalline phthalocyanine crude pigments in the presence of surfactants and water on a stirred ball mill with a disk stirrer mechanism. The grinding media used are steel balls of diameter 0.25 mm. 85% of the mill volume is filled with grinding media. No data are given on the peripheral speed of the stirrer mechanism or on the energy input.

U.S. Pat. No. 4,522,654 (V) describes the preparation of phthalocyanine pigment dispersions by wet milling of coarsely crystalline phthalocyanine crude pigments in a nonaqueous, solvent-containing binder system on a roll mill or stirred ball mill with disk stirrer mechanism. In the case of grinding in a stirred ball mill, steel balls with a diameter of from 0.25 to 0.45 mm are used. No data are given on the peripheral speed of the stirrer mechanism or on the energy input.

Processes IV and V are not universally applicable, since they are in each case suitable only for one class of pigment and a limited area of application. With this design of the stirred ball mills, high energy inputs are not possible. Milling is carried out with steel balls, which are of high specific gravity. In many cases, this leads to intolerable reductions in the clarity of the shade, owing to the iron oxides which are inevitably obtained as an abrasion product of the grinding media. If nonmetallic grinding media, of lower specific gravity, are used, the milling output is low and adequate fine division is not achieved.

The object of the invention was to develop a universally applicable process for the preparation of pigment preparations based on pigments of different classes and different carrier materials for various areas of application.

It has been found that the object according to the invention can surprisingly be achieved by wet milling of coarsely crystalline crude pigments, or pigments or prepigments which are difficult to disperse, with the desired carrier material, which is part of a flocculation-stable, aqueous, aqueous-organic or organic medium, in this medium in a stirred ball mill with high energy density and small, nonmetallic grinding media until the resulting pigment particles reach a defined minimum degree of fine division.

The present invention provides a process for the preparation of pigment preparations, which comprises wet milling the crude pigments which are present in coarsely crystalline state, or prepigments or pigments which are present in a form in which they are difficult to disperse, in a concentration of from 20 to 60% by weight, preferably from 30 to 50% by weight, based on the total weight of the pigment preparation, in a flocculation-stable liquid medium in a stirred ball mill which is operated with a peripheral stirrer speed of more than 12 m/s, under the action of nonmetallic grinding media with a diameter of less than or equal to 1.0 mm, until the desired degree of fine division is reached, and then isolating the pigment preparation.

The resulting pigment preparations are notable for outstanding color and flow properties and for good flocculation stability and good settling behavior.

For the novel preparation of these pigment preparations, a high milling effect is necessary, which is achieved by the use of specific embodiments of the stirred ball mills. Examples of suitable stirred ball mills for milling to the desired efficiency are those which are designed for batchwise and continuous operation, contain a cylindrical or hollow-cylindrical milling chamber in horizontal or vertical construction and can be operated at a specific power density of more than 1.0 kW, in particular more than 2.5 kW, per liter of milling space and whose peripheral stirrer speed is more than 12 m/s. The constructional design ensures that the high milling energy is transmitted to the millbase. Mills suitable for this purpose are described, for example, in U.S. Pat. No. 5,062,577. If the milling intensity of the mill is too low, then the good properties according to the invention, especially the high color strength and outstanding color properties of the pigment preparations, are not achieved. The energy output by the stirrer mechanism per unit time is transmitted to the millbase as comminution energy and as frictional energy in the form of heat. In order reliably to dissipate this large quantity of heat it is necessary to take constructional measures in order to keep the ratio of milling space to milling-chamber surface area (cooling area) as low as possible. At high throughputs milling is carried out in circulation and the heat can be dissipated to the outside predominantly via the millbase. Examples of the grinding media used are nonmetallic balls made, for example, of zirconium oxide, zirconium mixed oxide, aluminum oxide or quartz, with a diameter of less than or equal to 1.0 mm; it is expedient to use those with a diameter of from 0.2 to 0.9 mm, preferably from 0.3 to 0.5 mm. It is, of course, also possible to employ steel grinding media, though in the majority of cases this leads to an unwanted reduction in the clarity of the shade.

When continuous stirred ball mills are used, the grinding media are separated from the millbase preferably by centrifugation, so that there is virtually no contact between the separation devices and the grinding media, thus making it possible to a large extent to prevent blockages in the separation devices. In this case the stirred ball mills are operated with a high grinding charge (>70% by volume).

For wet milling, use is expediently made of the crude pigments which are obtained in coarsely crystalline form from the synthesis or in the course of purification, or of mixtures of these crude pigments, pigment preparations of these crude pigments, surface-treated crude pigments or coarsely crystalline mixed-crystal crude pigments. The purity, crystal size, crystal quality and, if appropriate, mixed-crystal formation are critical for the physical state of the crude pigments. It is generally necessary to mill pure and highly crystalline crude pigments for longer than crude pigments which contain impurities and have a disrupted crystal lattice. Examples of suitable crude pigments are dioxazine, phthalocyanine, anthanthrone, preylene and quinacridone crude pigments, especially coarsely crystalline quinacridone crude pigments of the β-phase or γ-phase, coarsely crystalline quinacridone mixed-crystal crude pigments, coarsely crystalline copper phthalocyanine crude pigments of the α-phase or β-phase, coarsely crystalline dioxazine crude pigments, coarsely crystalline perylene crude pigments and coarsely crystalline anthanthrone crude pigments.

The term coarsely crystalline crude pigments refers to those crude pigments which are unsuitable for direct use for the pigmentation of organic materials. In most cases these crude pigments have a mean particle size $D_{50}$ of more than 1 μm.

It is also possible to employ prepigments, or pigments, which are difficult to disperse, or else mixtures of coarsely crystalline crude pigments, prepigments and pigments which cannot be dispersed completely under conventional milling conditions in stirred ball mills with nonmetallic grinding media of low specific gravity, for example in the stirred ball mills described in EP-A 0 408 449, U.S. Pat. No. 2,816,115 and U.S. Pat. No. 3,775,149. Of course, it is also possible to convert readily dispersible pigments, prepigments or crude pigments into pigment preparations by the novel process.

The dispersion behavior of a pigment is its behavior in the course of dispersion with regard to the change in various criteria of the dispersed state (particle size, color strength, luster) as a function of various parameters (dispersion apparatus, dispersion method, dispersion time, millbase composition).

In order to assess the dispersion behavior of difficult-to-disperse pigments, it is principally the color strength which is employed. It increases with increasing quality of the dispersed state and with increasing particle fineness. Consequently it is also possible to use the mean particle diameter $(D_{50})$ for assessing dispersibility. The test medium and the dispersion conditions are laid down beforehand depending on the area of application of the pigment. One yardstick used is the dispersion effort required to achieve a particular mean particle size (dispersion time). The mean particle size is dependent on the particular pigment employed. The data obtained are only comparable under identical dispersion conditions. If the maximum permissible value is exceeded under standard dispersion conditions ($t_{max}$=240 minutes), this pigment is difficult to disperse and is unsuitable for use in the preparation of pigment preparations in a conventional stirred ball mill.

Examples of prepigments which are regarded as difficult to disperse are dioxazine, phthalocyanine, anthanthrone, perylene and quinacridone prepigments. Pigments regarded as difficult to disperse are azo, dioxazine, phthalocyanine, anthanthrone, perylene, quinacridone, pyrrolopyrrole, isoindolinone and isoindoline pigments.

The term flocculation-stable liquid medium refers to a liquid which prevents reagglomeration of the dispersed pigment particles in the dispersion. The resistance to flocculation is determined by means of the rubout test, in which the difference in color strength or shade between the flocculated and deflocculated sample is determined by a calorimetric method. A medium which is flocculation-stable in the context of the present invention produces a difference in color strength of less than 10%. The color strength here is determined in accordance with DIN 55986. The flocculation-stable liquid medium consists of a carrier material which is identical to, or forms a homogeneous phase with, the subsequently defined application media to be pigmented, and, if desired, of water, one or more organic solvents or a mixture of water and said solvents. Examples of suitable flocculation-stable liquid media are dispersants, resins such as novolaks, alkyd-melamine resins, acrylic-melamine resins or polyurethane resins, plasticizers such as diisodecyl phthalate or dioctyl phthalate, and mixtures of water or of an organic solvent or of a combination of water and an organic solvent with a dispersant, resin or plasticizer, and also solutions of polymers, for example polyolefin waxes, in an organic solvent. Particularly suitable organic solvents in the context of the present invention are glycols and glycol ethers such as ethylene glycol, ethylene glycol dimethyl ether, propylene glycol, butylene glycol, diethylene glycol or triethylene glycol.

Dispersants of particular interest are fatty amine polyglycol ethers, fatty alcohol polyglycol ethers, fatty acid polyglycol esters, fatty acid taurides, fatty acid N-methyltaurides, fatty acid sarcosides, fatty acids isethionates, alkylphenol polyglycol ethers, alkylnaphthalenesulfonates, alkylphenylsulfonates, alkylphenol polyglycol ether sulfates, fatty alcohol polyglycol ether sulfates and fatty amine acetates.

The flocculation-stable liquid medium may, if desired, comprise other additives, examples being ureas, alkyl orthophosphoric esters and preservatives.

Water as such, monohydric alcohols, ketones or mixtures thereof with water are not flocculation-stable liquid media in the context of the present invention.

Milling is preferably carried out in the neutral pH range. The concentration of pigments in the millbase is dependent on the rheology of the dispersion and on the intended area of application of the pigment preparation and is within the limits indicated above. The viscosity of the novel pigment preparations is from 0.1 to 35 Pas, preferably from 0.8 to 25 Pas, in particular from 1 to 10 Pas.

The duration of milling depends on the fineness requirements for the particular area of application, for example the paints, printing or plastics sector. Consequently, the residence time of the millbase in the stirred ball mill is in general between 5 and 60 minutes, depending on the required fineness. Milling is normally carried out for a period of from 5 to 45 minutes, preferably from 10 to 30 minutes.

Milling is carried out at temperatures in the range from 0° to 100° C., expediently at a temperature between 10° and 70° C., and preferably at from 20° to 60° C.

The millbase can also comprise further customary additives, examples being antifoams, fillers, standardizing agents, preservatives, drying retardants and foam-reducing agents.

Utilizing the possibilities for variation which are thus available, it is possible to prepare the pigment preparations obtained by the novel process for a wide variety of intended applications. This can be controlled via the nature of the crude pigment, prepigment or pigment, the nature of the carrier material and additive, and by the concentration thereof and the duration and temperature of wet milling. The pigment preparations are obtained in the form of liquid dispersions or pastes with the viscosities indicated above. The milling conditions and millbase compositions which are optimum for the particular area of application must be determined by experimentation.

The preparation of pigment preparations by the novel process has proven particularly economical and environment-friendly because the wet milling does not give rise to air contamination caused by the development of dust. Furthermore, only small quantities of chemicals and solvents requiring further processing afterwards are employed. Therefore, no disposal problems occur. When coarsely crystalline crude pigments are employed, the customary, laborious processes of fine division and of the solvent finish for conversion to the pigment form can be omitted. The solvent losses caused by the hitherto necessary solvent finish are avoided, and complex apparatus for the solvent finish and solvent regeneration is not required.

When milling is carried out in an aqueous or aqueous-organic medium it is possible to employ the wet, coarsely crystalline crude pigments, thereby avoiding the expensive drying of the crude pigments. Since the same apparatus for fine division is employed for all areas of application, there is no need for the uneconomic holding ready of different types of apparatus for fine division. It was unforeseeable and surprising that the fine division and dispersion of coarsely crystalline crude pigments is possible in one step by wet milling in a stirred ball mill with high power density and small nonmetallic grinding media and that the result of such medium, in coloring terms, is the same as that obtained under conventional milling conditions with the use of the pigment produced from the same coarsely crystalline crude pigment. It was also surprising that the dispersion of pigments which are difficult to disperse is successful in highly viscous media at high pigment concentrations, since the efficiency of dispersion apparatus is based predominantly on the mobility of the grinding media, which under these milling conditions is severely restricted, thereby, in accordance with prevailing opinion, having an adverse effect on the dispersion operation and leading to the optimum color strength not being achieved. As a consequence, it has hitherto been necessary to employ expensive and complex comminution apparatus, for example compounders and extruders, for the above-described fine division and dispersion of coarsely crystalline crude pigments and difficult-to-disperse prepigments and pigments.

The pigment preparations which are obtainable in accordance with the present invention are notable for their outstanding color and flow properties, especially for high flocculation stability, ease of dispersibility, good luster properties and high color strength.

The pigment preparations prepared in accordance with the invention can be used for pigmenting high molecular weight organic materials of natural or synthetic origin, printing inks or other inks.

Examples of high molecular weight organic materials are cellulose ethers and cellulose esters, such as ethylcellulose, nitrocellulose, cellulose acetate or cellulose butyrate, natural resins or synthetic resins, such as addition polymerization resins or condensation resins, for example amino resins, especially urea- and melamine-formaldehyde resins, alkyd resins, acrylic resins and phenolic resins, polycarbonates, polyolefins, such as polystyrene, polyvinyl chloride, polyethylene, polypropylene, polyacrylonitrile and polyacrylates, polyamides, polyurethanes or polyesters, rubber, casein, latices, and silicone and silicone resins, individually or in mixtures.

In this context it is unimportant whether the high molecular weight organic compounds mentioned are in the form of plastic masses, casting resins, melts, pastes or spinning solutions, paints, stains, foams, drawing inks, writing inks, mordants, coating materials or printing inks.

To evaluate the properties of the pigment preparations produced according to the invention in the paints sector, a selection was made from the large number of known varnishes of a long-oil, solvent-containing, aromatic-free alkyd resin varnish (AKH varnish).

To evaluate the properties of the pigment preparations produced according to the invention in the sector of aqueous emulsion paints, an emulsion paint based on polyvinyl acetate (PVA emulsion paint) was selected.

To evaluate the properties of the pigment preparations produced according to the invention in the textile printing sector, a solvent-free, acrylate-based textile printing ink (ACL textile print) was selected.

To evaluate the properties of the pigment preparations produced according to the invention in the plastics sector, a selection was made from the large number of known plastics of plasticized polyvinyl chloride (PVC).

To evaluate the properties of the pigment preparations produced according to the invention in the printing sector, a selection was made from the large number of known printing systems of an aqueous-alcoholic flexographic printing system based on an acrylic resin (AWF flexo-graphic print).

The color strength and shade were determined in accordance with DIN 55986.

The crystal phase of the crude pigments, prepigments, pigments, mixed-crystal pigments and pigment formulations was determined by X-ray spectroscopy.

The mean particle diameter $D_{50}$ of the coarsely crystalline crude pigments was determined by laser light diffraction.

The mean particle diameter $D_{50}$ of the pigments in the pigment preparations was determined by graphical evaluation of electron micrographs.

The viscosity of the pigment preparations was determined with a Haake rotary viscometer.

In the text above and in the following examples, parts and percentages of the substances thus described are in each case by weight.

EXAMPLE 1

A suspension consisting of 26.3 parts of water, 10 parts of diethylene glycol, 19 parts of ethylene glycol, 4.5 parts of urea, 0.2 part of alkyl orthophosphoric ester, 9 parts of surfactant of an ethoxylated seven-ring novolak based on nonylphenol and 31 parts of coarsely crystalline crude pigment (C.I. Pigment Violet 23, C.I. No. 51 319, $D_{50}$=8 μm) is metered into a stirred ball mill of type PML (manufactured by Draiswerke GmbH, Mannheim) which is filled with 336 parts of zirconium mixed-oxide beads having a diameter of 0.3–0.4 mm as grinding media, and milling is carried out at a peripheral stirrer speed of 15.6 m/s and a specific power density of 3.1 kW per liter of milling space at 20°–25° C. for 30 minutes. The millbase dispersion is then screened to remove the grinding media.

A pigment preparation is obtained which in the ACL textile print gives strongly colored prints on cotton. The color strength attained is the same as that achieved when using the pigment prepared from the same coarsely crystalline crude pigment (Pigment Violet 23) by fine division and finishing according to U.S. Pat. No. 4,253,839, under standard milling conditions in a conventional stirred ball mill.

Comparison Example 1a

If the crude pigment employed above is milled under the milling conditions described in DE-A-3 446 177 Example 2 on a bead mill with disk stirrer mechanism, using zirconium mixed-oxide beads of diameter 0.3–0.4 mm and with a peripheral stirrer speed of 10.2 m/s for 30 minutes, followed by screening, a pigment preparation is obtained which in the ACL textile print gives very weakly colored and markedly less clear prints on cotton than the pigment preparation prepared in accordance with the invention. Even if the duration of milling is extended by four times, the resulting pigment preparation still gives prints which are distinctly weaker in color and less clear than the pigment preparation prepared in accordance with the invention.

EXAMPLE 2

A suspension consisting of 5.26 parts of water, 2 parts of diethylene glycol, 3.8 parts of ethylene glycol, 0.9 part of urea, 0.04 part of alkyl orthophosphoric ester, 1.8 parts of surfactant of an ethoxylated seven-ring novolak based on nonylphenol and 6.2 parts of coarsely crystalline crude pigment (C.I. Pigment Violet 23, $D_{50}$=8 μm) is metered into a stirred ball mill of type DCP-SF170 (manufactured by Draiswerke GmbH, Mannheim) which is filled with 55 parts of zirconium oxide beads of diameter 0.3–0.4 mm as grinding media and milling is carried out at a rotary speed of 780 rpm and at a power of 40 kW with a throughput of 1000 parts per hour, in circulation at 40°–55° C. for 100 minutes.

A pigment preparation is obtained which in the ACL textile print gives strongly colored prints on cotton.

EXAMPLE 3

A suspension consisting of 18.3 parts of water, 13 parts of diethylene glycol, 13 parts of ethylene glycol, 4.5 parts of urea, 0.45 part of alkyl orthophosphoric ester, 7.2 parts of surfactant of an ethoxylated seven-ring novolak based on nonylphenol, 0.18 part of preservative and 33.3 parts of coarsely crystalline crude pigment (C.I. Pigment Blue 15, C.I. No. 74 160, $D_{50}$=64 μm) is metered into a stirred ball mill of type PML (manufactured by Draiswerke GmbH, Mannheim) which is filled with 336 parts of zirconium mixed-oxide beads of diameter 0.3–0.4 mm as grinding media, and milling is carried out at a peripheral stirrer speed of 15.6 m/s and a specific power density of 3.1 kW per liter of milling space at 20°–25° C. for 30 minutes. The millbase dispersion is then screened to remove the grinding media. A pigment preparation is obtained which in the ACL textile print gives strongly colored and very clean prints on cotton. The viscosity of the pigment preparation is 0.1 Pas.

EXAMPLE 3a (comparison example)

If the milling in Example 3 is repeated with the sole modification that, instead of the zirconium mixed-oxide grinding media, 685 parts of steel grinding media of diameter 0.2–0.4 mm are employed, a pigment preparation is obtained which in the ACL textile print gives markedly less clear prints on cotton than the pigment preparation prepared according to Example 3.

EXAMPLE 4

A suspension consisting of 20 parts of water, 17.1 parts of propylene glycol, 3.6 parts of urea, 6.75 parts of surfactant of an ethoxylated seven-ring novolak based on nonylphenol, 0.18 part of preservative and 42.3 parts of coarsely crystalline crude pigment (C.I. Pigment Blue 15:3, C.I. No. 74 160, $D_{50}$=1.6 μm) is metered into a stirred ball mill of type PML (manufactured by Draiswerke GmbH, Mannheim) which is filled with 336 parts of zirconium mixed-oxide beads of diameter 0.3–0.4 mm as grinding media, and milling is carried out at a peripheral stirrer speed of 15.6 m/s and a specific power density of 3.1 kW per liter of milling space at 20°–25° C. for 7.5 minutes. The millbase dispersion is then screened to remove the grinding media.

A pigment preparation is obtained which in the ACL textile print gives strongly colored and very clean prints on cotton. The viscosity of the pigment preparation is 1.2 Pas.

EXAMPLE 4a (comparison example)

If the milling in Example 4 is repeated with the sole modification that, instead of the zirconium mixed-oxide grinding media, 685 parts of steel grinding media of diameter 0.2–0.4 mm are employed, a pigment preparation is obtained which in the ACL textile print gives markedly less clear prints on cotton than the pigment preparation prepared according to Example 4.

EXAMPLE 5

A suspension consisting of 34.9 parts of water, 17.1 parts of ethylene glycol, 0.18 part of preservative, 10.8 parts of surfactant of an ethoxylated seven-ring novolak based on nonylphenol, 22.5 parts of pigment (C.I. Pigment Blue 15:1, C.I. No. 74 160), and 4.5 parts of coarsely crystalline crude pigment (Pigment Violet 23, $D_{50}$=8 µm) is metered into a stirred ball mill of type PML (manufactured by Draiswerke GmbH, Mannheim) which is filled with 336 parts of zirconium mixed-oxide beads of diameter 0.3–0.4 mm as grinding media, and milling is carried out at a peripheral stirrer speed of 15.6 m/s and a specific power density of 3.1 kW per liter of milling space at 20°–25° C. for 30 minutes. The millbase dispersion is then screened to remove the grinding media.

A pigment preparation is obtained which in the ACL textile print gives strongly colored prints on cotton. The viscosity of the pigment preparation is 1.0 Pas.

EXAMPLE 6

A suspension consisting of 15 parts of water, 46 parts of ethylene glycol, 16.5 parts of surfactant of an ethoxylated fatty alcohol polyglycol ether based on oleyl alcohol, 0.2 part of preservative, 2.3 parts of N-(9-ethyl-3-carbazole) oleylamide and 20 parts of coarsely crystalline crude pigment (Pigment Violet 23, $D_{50}$=8 µm) is metered into a stirred ball mill of type PML (manufactured by Draiswerke GmbH, Mannheim) which is filled with 500 parts of zirconium oxide beads of diameter 0.3–0.5 mm as grinding media, and milling is carried out at a peripheral stirrer speed of 15.6 m/s and a specific power density of 3.1 kW per liter of milling space at 20°–25° C. for 30 minutes. The millbase dispersion is then screened to remove the grinding media.

A pigment preparation is obtained which in the solvent-containing AKH varnish and in the aqueous PVA emulsion paint gives strong colorations.

EXAMPLE 7

A suspension consisting of 59.3 parts of water, 5.7 parts of propylene glycol, 5.7 parts of diethylene glycol, 0.2 part of preservative, 4.5 parts of surfactant of an ethoxylated fatty alcohol polyglycol ether based on oleyl alcohol, 4.5 parts of surfactant based on an alkylphenol novolak and a fatty alcohol polyglycol ether, 0.5 parts of pigment dispersant based on the condensation product of naphthoyleneben-zimidazoledicarboxylic acid and n-propylpiperazine and 19.5 parts of coarsely crystalline crude pigment (C.I. Pigment Red 168, C.I. No. 59 300, $D_{50}$=11 µm) is metered into a stirred ball mill of type PML (manufactured by Draiswerke GmbH, Mannheim) which is filled with 336 parts of zirconium mixed-oxide beads of diameter 0.3–0.4 mm as grinding media, and milling is carried out at a peripheral stirrer speed of 15.6 m/s and a specific power density of 3.1 kW per liter of milling space at 20°14 25° C. for 20 minutes. The millbase dispersion is then screened to remove the grinding media.

A pigment preparation is obtained which in the solvent-containing AKH varnish and in the aqueous PVA emulsion paint gives strong colorations.

EXAMPLE 8

A suspension consisting of 19.8 parts of water, 42 parts of ethylene glycol, 0.2 part of preservative, 2.0 parts of N-(9-ethyl-3-carbazole)oleylamide, 16 parts of surfactant of an ethoxylated fatty alcohol polyglycol ether based on oleyl alcohol and 20 parts of prepigment (Pigment Violet 23, prepared according to U.S. Pat. No. 4,253,839) is metered into a stirred ball mill of type PML (manufactured by Draiswerke GmbH, Mannheim) which is filled with 336 parts of zirconium mixed-oxide beads of diameter 0.3–0.4 mm as grinding media, and milling is carried out at a peripheral stirrer speed of 15.6 m/s and a specific power density of 3.1 kW per liter of milling space at 20°–25° C. for 30 minutes. The millbase dispersion is then screened to remove the grinding media.

A pigment preparation is obtained which in the solvent-containing AKH varnish and in the aqueous PVA emulsion paint gives strong colorations. The viscosity of the pigment preparation is 3.5 Pas.

EXAMPLE 9

A suspension consisting of 35.8 parts of water, 20 parts of propylene glycol, 0.2 part of preservative, 2.0 parts of N-(9-ethyl-3-carbazole)oleylamide, 12 parts of bisphenol polyglycol ether and 30 parts of prepigment (Pigment Violet 23, prepared according to U.S. Pat. No. 5,318,627) is metered into a stirred ball mill of type PML (manufactured by Draiswerke GmbH, Mannheim) which is filled with 336 parts of zirconium mixed-oxide beads of diameter 0.3–0.4 mm as grinding media, and milling is carried out at a peripheral stirrer speed of 15.6 m/s and a specific power density of 3.1 kW per liter of milling space at 20°–25° C. for 13 minutes. The millbase dispersion is then screened to remove the grinding media.

A pigment preparation is obtained which in the aqueous PVA emulsion paint gives strong colorations. The viscos- ity of the pigment preparation is 25 Pas.

EXAMPLE 10

A suspension consisting of 12.8 parts of water, 0.2 part of preservative, 20 parts of the sulfosuccinic monoester of an ethoxylated three-ring phenol novolak, 2.0 parts of an alky-lnaphthalenesulfonate and 50 parts of prepigment (Pigment Blue 15 with 30% β fraction, prepared from coarsely crystalline crude pigment (Pigment Blue 15:3) in analogy to U.S. Pat. No. 4,253,839) is metered into a stirred ball mill of type PML (manufactured by Draiswerke GmbH, Mannheim) which is filled with 336 parts of zirconium mixed-oxide beads of diameter 0.3–0.4 mm as grinding media, and milling is carried out at a peripheral stirrer speed of 15.6 m/s and a specific power density of 3.1 kW per liter of milling space at 20°–25° C. for 13 minutes. The millbase dispersion is then screened to remove the grinding media.

A pigment preparation is obtained which in the aqueous PVA emulsion paint gives strong colorations.

EXAMPLE 11

A suspension consisting of 82 parts of diisodecyl phthalate and 26 parts of coarsely crystalline mixed-crystal crude pigment (consisting of 80% C.I. Pigment Red 122, C.I. No. 73 915 and 20% C.I. Pigment Violet 19, C.I. No. 73 900, $D_{50}$=2.5 µm) is metered into a stirred ball mill of type PML (manufactured by Draiswerke GmbH, Mannheim) which is filled with 500 parts of zirconium oxide beads of diameter 0.3–0.5 mm as grinding media, and milling is carried out at a peripheral stirrer speed of 15.6 m/s and a specific power density of 3.1 kW per liter of milling space at 20°–25° C. for 30 minutes. The millbase dispersion is then screened to remove the grinding media.

A pigment preparation is obtained which in PVC gives strong colorations. The viscosity of the pigment preparation is 23.9 Pas.

EXAMPLE 12

A suspension consisting of 85 parts of diisodecyl phthalate and 26 parts of coarsely crystalline crude pigment (C.I.

Pigment Brown 26, C.I. No. 71129, $D_{50}$=9 µm) is metered into a stirred ball mill of type PML (manufactured by Draiswerke GmbH, Mannheim) which is filled with 500 parts of zirconium oxide beads of diameter 0.3–0.5 mm as grinding media, and milling is carried out at a peripheral stirrer speed of 15.6 m/s and a specific power density of 3.1 kW per liter of milling space at 20°–25° C. for 30 minutes. The millbase dispersion is then screened to remove the grinding media.

A pigment preparation is obtained which in PVC gives strong colorations. The viscosity of the pigment preparation is 5.5 Pas.

EXAMPLE 13

A suspension consisting of 41.8 parts of water, 10 parts of propylene glycol, 0.2 part of preservative, 8 parts of surfactant based on a mixture of ethoxylated phenol polyglycol ether and alkylphenol polyglycol ether, and 40 parts of difficult-to-disperse pigment (C.I. Pigment Yellow 13, C.I. No. 21 100) Is metered into a stirred ball mill of type PML (manufactured by Draiswerke Gmbh, Mannheim) which is filled with 336 parts of zirconium mixed-oxide beads of diameter 0.3–0.4 mm as grinding media, and milling is carried out at a peripheral stirrer speed of 15.6 m/s and a specific power density of 3.1 kW per liter of milling space at 20° C. for 13 minutes. The millbase dispersion is then screened to remove the grinding media.

A pigment preparation is obtained whose mean particle diameter is 0.065 µm. In the aqueous PVA emulsion paint, strong colorations are obtained. Owing to its low particle size and high color strength, the pigment preparation can be employed for pigmenting drawing inks, fiber-tipped pen inks, fineliner inks and rollerball inks. The dispersibility of the pigments in the above system is tested as follows:

A suspension consisting of 100 parts of water, 45 parts of propylene glycol, 0.9 part of preservative, 36 parts of surfactant based on a mixture of ethoxylated phenol polyglycol ether and alkylphenol polyglycol ether, and 180 parts of pigment (C.I. Pigment Yellow 13) is metered into a stirred ball mill of type PM1 (manufactured by Draiswerke GmbH, Mannheim) which is filled with 1100 parts of quartz beads of diameter 0.3 mm as grinding media, and milling is carried out at a peri-pheral stirrer speed of 10.2 m/s (2790 rpm) and a specific power density of 0.69 kW per liter of milling space at 20° C. for 240 minutes. After a milling time of 30 minutes, 44 parts of water are added, and the same quantity of water is added after 90 minutes as well. The millbase dispersion is then screened to remove the grinding media.

The limit value of the mean particle size $D_{50}$ is dependent on the particular pigment employed and for Pigment Yellow 13 is 0.089 µm. If the mean particle size $D_{50}$ after a dispersion time of 240 minutes is above this value, then the pigment cannot be employed in a conventional stirred ball mill for preparing the above pigment preparation.

EXAMPLE 14

A suspension consisting of 41.8 parts of water, 10 parts of propylene glycol, 0.2 part of preservative, 8 parts of surfactant based on a mixture of ethoxylated phenol polyglycol ether and alkylphenol polyglycol ether and 40 parts of pigment (C.I. Pigment Yellow 13) is metered into a stirred ball mill of type DCP-3 (manufactured by Draiswerke GmbH, Mannheim) which is filled with 37 parts of zirconium oxide beads of diameter 0.4–0.6 mm as grinding media, and milling is carried out in 2 passes with a rotary speed of 850 rpm and with a power of 36 kW and a throughput of 60 parts per hour at 55°–60° C.

A pigment preparation is obtained whose mean particle diameter is 0.071 µm. Strong colorations are obtained in the aqueous PVA emulsion paint. Owing to its low particle size and high color strength, the pigment preparation can be used for pigmenting drawing inks, fiber-tipped pen inks, fineliner inks and rollerball inks.

EXAMPLE 15

A suspension consisting of 38.3 parts of water, 10 parts of propylene glycol, 0.2 part of preservative, 6.5 parts of surfactant based on ethoxylated condensation product of bisphenol and tallow fatty alcohol and 45 parts of difficult-to-disperse pigment (C.I. Pigment Red 122) is metered into a stirred ball mill of type PML (manufactured by Draiswerke GmbH, Mannheim) which is filled with 336 parts of zirconium mixed-oxide beads of diameter 0.3–0.4 mm as grinding media, and milling is carried out at a peripheral stirrer speed of 15.6 m/s and a specific power density of 3.1 kW per liter of milling space at 20°–25° C. for 25 minutes. The millbase dispersion is then screened to remove the grinding media.

A pigment preparation is obtained which in the aqueous PVA emulsion paint gives strong colorations.

EXAMPLE 16

A suspension consisting of 31.0 parts of water, 8 parts of propylene glycol, 0.16 part of preservative, 4 parts of surfactant based on ethoxylated phenol polyglycol ether and alkylphenol polyglycol ether, 0.8 part of surfactant of the condensation product of sodium dimethylnaphthalenesulfonate and formaldehyde and 36 parts of difficult-to-disperse pigment (C.I. Pigment Red 184, C.I. No. 12 487) are metered into a stirred ball mill of type PML (manufactured by Draiswerke GmbH, Mannheim) which is filled with 336 parts of zirconium mixed-oxide beads of diameter 0.3–0.4 mm as grinding media, and milling is carried out at a peripheral stirrer speed of 15.6 m/s and a specific power density of 3.1 kW per liter of milling space at 20°–25° C. for 22 minutes. The millbase dispersion is then screened to remove the grinding media.

A pigment preparation is obtained which in the AWF flexographic print gives strongly colored prints and in the aqueous PVA emulsion paint gives strong colorations. The viscosity of the pigment preparation is 0.8 Pas.

EXAMPLE 17

A suspension consisting of 20.0 parts of water, 42 parts of diethylene glycol, 2.0 parts of N-(9-ethyl-3-carbazole) oleylamide, 16 parts of surfactant of an ethoxylated fatty alcohol polyglycol ether based on oleyl alcohol and 20 parts of difficult-to-disperse pigment (Pigment Violet 23, prepared according to U.S. Pat. No. 4,253,839) is metered into a stirred ball mill of type PML (manufactured by Draiswerke GmbH, Mannheim) which is filled with 336 parts of zirconium mixed-oxide beads of diameter 0.3–0.4 mm as grinding media, and milling is carried out at a peripheral stirrer speed of 15.6 m/s and a specific power density of 3.1 kW per liter of milling space at 20°–25° C. for 10 minutes. The millbase dispersion is then screened to remove the grinding media.

A pigment preparation is obtained which in the solvent-containing AKH varnish and in the aqueous PVA emulsion paint gives strong colorations. This pigment preparation cannot be prepared in a conventional stirred ball mill, since the pigment is difficult to disperse and does not attain the optimum color strength.

EXAMPLE 18

A suspension consisting of 42.3 parts of water, 5.0 parts of urea, 0.5 part of alkyl orthophosphoric ester, 15 parts of surfactant of an ethoxylated seven-ring novolak based on nonylphenol, 0.2 part of preservative and 36.7 parts of coarsely crystalline crude pigment (C.I. Pigment Blue 15, $D_{50}$ =64 μm) is metered into a stirred ball mill of type PML (manufactured by Draiswerke GmbH, Mannheim) which is filled with 336 parts of zirconium mixed-oxide beads of diameter 0.3–0.4 mm as grinding media, and milling is carried out at a peripheral stirrer speed of 15.6 m/s and a specific power density of 3.1 kW per liter of milling space at 20°–30° C. for 30 minutes. The millbase dispersion is then screened to remove the grinding media.

A pigment preparation is obtained which in the ACL textile print gives strongly colored prints on cotton.

EXAMPLE 19

A suspension consisting of 34.5 parts of water, 10.9 parts of diethylene glycol, 3.6 parts of urea, 1.5 parts of surfactant of an alkylnaphthalenesulfonate, 3.6 parts of surfactant of an ethoxylated fatty amine polyglycol ether based on oleyl alcohol, 5.1 parts of surfactant of an ethoxylated seven-ring novolak based on nonylphenol, 0.15 part of preservative and 25.5 parts of difficult-to-disperse isoindoline pigment (C.I. Pigment Yellow 139) is metered into a stirred ball mill of type PML (manufactured by Draiswerke GmbH, Mannheim) which is filled with 336 parts of zirconium mixed-oxide beads of diameter 0.3–0.4 mm as grinding media, and milling is carried out at a peripheral stirrer speed of 15.6 m/s and a specific power density of 3.1 kW per liter of milling space at 20°–30° C. for 30 minutes. The millbase dispersion is then screened to remove the grinding media.

A pigment preparation is obtained which in the ACL textile print gives strongly colored prints on cotton. The viscosity of the pigment preparation is 2.9 Pas.

EXAMPLE 20

A suspension consisting of 7.4 parts of water, 10 parts of ethylene glycol, 0.1 part of preservative, 8 parts of the sulfosuccinic monoester of an ethoxylated three-ring phenol novolak, 2 parts of the condensation product of sodium dimethylnaphthalenesulfonate and formaldehyde and 22.5 parts of difficult-to-disperse pigment (C.I. Pigment Blue 15:3) is metered into a stirred ball mill of type LMZ 10 (manufactured by Netzschwerke GmbH, Selb, Bavaria) which is filled with 20.7 parts of zirconium mixed-oxide beads of diameter 0.4–0.6 mm as grinding media, and milling is carried out at a peripheral stirrer speed of 12.7 m/s and a specific power density of 1.2 kW per liter of milling space at 40°–50° C. for 60 minutes, in circulation with a throughput of 600 l/h. A pigment preparation is obtained which in the AWF flexographic print gives strongly colored prints.

We claim:

1. A process for the preparation of liquid pigment preparations, which comprises wet milling the crude pigments which are present in coarsely crystalline state, or prepigments or pigments which are present in a form in which they are difficult to disperse, in a concentration of from 20 to 60% by weight based on the total weight of the pigment preparation, in a flocculation-stable liquid medium and in a stirred ball mill which is operated with a peripheral stirrer speed of more than 12 m/s, under the action of nonmetallic grinding media with a diameter of less than or equal to 1.0 mm, until fine division is reached, and then isolating the liquid pigment preparation without a solvent finishing treatment.

2. The process as claimed in claim 1, wherein grinding media of zirconium oxide, zirconium mixed oxide, aluminum oxide or quartz are employed.

3. The process as claimed in claim 1, wherein grinding media with a diameter of from 0.2 to 0.9 mm are employed.

4. The process as claimed in claim 1, wherein grinding media with a diameter of from 0.3 to 0.5 mm are employed.

5. The process as claimed in claim 1, wherein the concentration of crude pigment, prepigment or pigment in the millbase is from 30 to 50% by weight, based on the total weight of the pigment preparation.

6. The process as claimed in claim 1, wherein the flocculation-stable liquid medium consists of a carrier material which is identical to, or forms a homogeneous phase with, the application medium to be pigmented, and, optionally, of water, an organic solvent or a mixture thereof.

7. The process as claimed in claim 1, wherein the flocculation-stable liquid medium is or comprises a dispersant; a resin; a plasticizer; a mixture of water with a dispersant, resin or plasticizer; a mixture of an organic solvent with a dispersant, resin or plasticizer; a mixture of water and an organic solvent with a dispersant, resin or plasticizer; or a solution of a polymer.

8. The process as claimed in claim 1, wherein the flocculation-stable liquid medium is a mixture of water with a glycol, glycol ether, alkyl phthalate, urea, novolak, alkyl orthophosphoric ester, alkoxylated fatty alcohol polyglycol ether, bisphenol polyglycol ether, alkylnaphthalenesulfonate, alkoxylated phenol polyglycol ether or alkylphenol polyglycol ether or N-(9-ethyl-3-carbazole)oleylamide or with a combination thereof.

9. The process as claimed in claim 1, wherein use is made of coarsely crystalline quinacridone crude pigments of the β-phase or σ-phase, coarsely crystalline quinacridone mixed-crystal crude pigments, coarsely crystalline copper phthalocyanine crude pigments of the α-phase or β-phase, coarsely crystalline dioxazine crude pigments, coarsely crystalline perylene crude pigments, coarsely crystalline anthanthrone crude pigments; dioxazine prepigments, copper phthalocyanine prepigments, quinacridone prepigments; azo pigments, dioxazine pigments, copper phthalocyanine pigments, quinacridone pigments, pyrrolopyrrole pigments, isoindolinone pigments or isoindoline pigments.

10. The process as claimed in claim 1, wherein mixtures of crude pigments, prepigments or pigments are employed.

11. The process as claimed in claim 1, wherein the duration of milling in the stirred ball mill is from 5 to 60 minutes.

12. The process as claimed in claim 1, wherein the duration of milling in the stirred ball mill is from 10 to 30 minutes.

13. The process as claimed in claim 1, wherein the stirred ball mill is operated with a power density of more than 1.0 kW per liter of milling space.

14. The process as claimed in claim 1, wherein the stirred ball mill is operated with a power density of more than 2.5 kW per liter of milling space.

* * * * *